Figure 1:
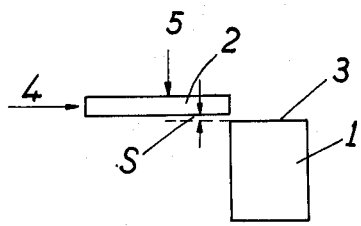

July 3, 1962     O. NIEDERHOFF     3,042,789

METHOD OF TREATING WORKPIECES BY SPARK EROSION

Filed June 25, 1959

Otto Niederhoff
Inventor:
By Cushman, Darby & Cushman
Attorneys

United States Patent Office 3,042,789
Patented July 3, 1962

3,042,789
METHOD OF TREATING WORKPIECES BY SPARK EROSION
Otto Niederhoff, Remscheid, Germany, assignor to Deutsche Edelstahlwerke Aktiengesellschaft, Krefeld, Germany
Filed June 25, 1959, Ser. No. 822,863
Claims priority, application Germany July 17, 1958
2 Claims. (Cl. 219—69)

The present invention relates to a method of treating workpieces by spark erosion.

As known, the method of processing metal workpieces by spark erosion is based upon the production of spark discharges between the workpiece and an electrode which may be regarded as being the tool, said discharges wearing away material from the surface of the workpiece, and at the same time to some extent also removing material from the face of the electrode. However, by the provision of suitable electrical circuits erosion can be substantially confined to the surface of the workpiece. Nevertheless, some loss of material from the face of the electrode will always occur, so that arrangements are necessary to compensate the undesirable wear experienced by the working face of the electrode.

Apart from the feed motion as such, which the electrode must perform in order to erode in succession all the sections of the workpiece which it is desired to process, an additional relative motion between the surfaces of the work and the electrode is frequently generated by rotating the electrode in relation to the work, for instance when boring holes or cutting threads.

One disadvantage inherent in this known technique of processing workpieces by spark erosion is that any inequalities in the surface of the work are reproduced on the surface of the working electrode, a result which arises because the electrode is also subject to wear, though to a much lesser extent than the workpiece. This in turn leads to the development of a more or less pronounced roughness on the processed work surface or to the result that some inequalities on the surface of the workpiece may not be equalised. Even when grinding by spark erosion, a process in which a more or less rapidly revolving electrode grinding disc is used for processing the workpiece surface, there is a risk that the afore-described difficulties may arise.

The present invention aims to overcome these drawbacks and to this end the method comprises displacing the electrode relatively to the surface of the workpieces to be processed whilst erosion proceeds and along a path which correctly maintains the width of the spark gap and which displacement is the result of combining a traversing motion whereby fresh sections of the electrode are continuously brought into operation and a motion in a direction at an angle to the said traverse, preferably a right angle.

FIGS. 1 to 4 illustrate several possible ways of performing the method according to the invention, the workpiece in each of the drawings being indicated by 1 and the electrode by 2.

FIG. 1 illustrates the case of a surface 3 of a flat workpiece 1 being worked by means of an electrode 2. To this end the electrode 2 must be passed across the surface of the work and the correct spark gap S maintained. The electrode is therefore conducted along a path which results from combining a traversing motion in the direction of arrow 4 and an in-feeding motion in the direction of arrow 5. In the illustrated example it has been assumed that these two motions are relatively at right angles to each other. However, the directions of the two feed motions may cross at an angle less than 90°. The traversing motion 4 is arranged continuously to bring fresh (unused) sections of the electrode into co-operation with the surface 3 of workpiece 1 which may for instance revolve about an axis perpendicular to surface 3. The object of the in-feeding motion 5 is to ensure that during the continuation of the work the spark gap S will be correctly maintained in such manner that the discharge will not be interrupted and that short-circuiting between electrode and workpiece cannot occur.

The fact that unused sections of the electrode are progressively brought into operation ensures that any inequalities in the unworked surface 3 of the workpiece 1 which may be reproduced on the surface of the electrode cannot produce undesirable effects, since immediately after having performed its work each electrode section moves out of the area in which it could continue to affect the worked face.

Figure 2:
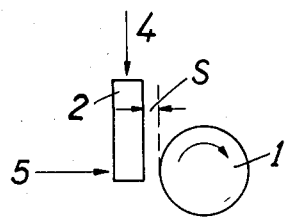
Figure 3:
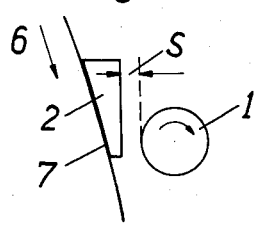

FIG. 2 shows the proposed method applied to a cylindrical workpiece 1 which revolves in the arrowed direction. The traversing motion 4 is in a direction parallel to a plane tangential to the peripheral surface of the cylinder. The in-feeding motion 5 is directed towards the centre of the workpiece and in the illustrated example this is at right angles to the electrode traverse 4. In this case the in-feeding motion likewise serves to maintain the width of the spark gap S.

Both in the case illustrated in FIG. 1 as well as in that shown in FIG. 2 the path of motion of the electrode results from the superimposition of the two motions 4 and 5. This resultant path indicated in FIG. 3 by arrow 6 can be produced by imparting a wedge-shape to electrode 2 and moving the same towards the workpiece surface along an inclined plane 7. This electrode of increasing thickness is moved linearly, the in-feed being produced by the increase in its thickness. Alternatively, an electrode 2 with planoparallel faces may likewise be used and the electrode clamped in a holder which will produce a motion of the working face of the electrode in the direction of arrow 6. For performing the type of work illustrated in FIG. 1 a similar arrangement could be provided.

Another alternative consists in using an electrode with a working face corresponding with the width of the surface section that is to be worked on the workpiece. Furthermore, reciprocating motion can be imparted to the electrode 2 in a direction perpendicular to the plane of the paper. This means that the method permits sections of surface to be processed, which are wider than the face of the electrode, an arrangement which may be useful in many cases.

The illustrated examples show a plane electrode. It would also be possible to form the working electrode face with profiles which are intended to be reproduced on the surface of the workpiece. These profiles must be orientated in the direction of electrode traverse 4 as otherwise they cannot be developed on the surface of the work, and in such a case a reciprocating motion of the electrode perpendicular to the plane of the paper would of course likewise not be permitted.

Figure 4:
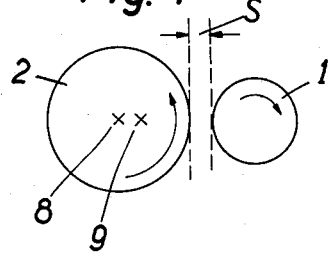

FIG. 4 illustrates a modification of the proposed method in which the workpiece is processed not by a flat electrode but by a cylindrical revolving electrode, that is to say by the periphery of an electrode which would be usually disc-shaped. The composite motion is in this case achieved by rotating the electrode in the direction shown by the arrow, not about its geometrical axis 8 but about an eccentric axis 9 displaced in the direction towards the centre axis of the revolving work 1. The eccentricity is selected to conform with the required traversing speed based upon the erosive capacity and the amount of electrode wear and the relative angular movements of the electrode and the workpiece being chosen to maintain the correct spark gap. The considerations which apply to the examples discussed in relation to FIGS. 1 to 3 likewise apply to the present case.

Figure 5:
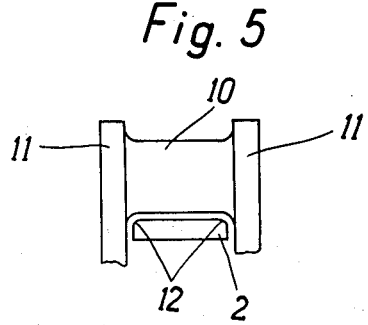

The method according to the invention has special importance in connection with the finishing of crankshaft journals. This type of application is illustrated in FIG. 5. The journal 10 and its crank webs 11 which are only fragmentarily shown are required to be surface finished. As known, such crankshaft journals are case-hardened and they must then be precision finished to permit a final polishing or lapping operation to be performed. In the past grinding wheels were used for this purpose and the work was clamped in such a way that the crankshaft journals could revolve centrically and be thus presented to the grinding wheel. This method of grinding presupposes that the surface of the grinding wheel is as smooth as required for finishing. Nevertheless, despite careful dressing of the grinding wheel face, there is always the risk of the surface of the work being scored in the peripheral direction. From time to time the machinist must stop his machine to check whether the crankshaft journal has reached the required limit of tolerance. This technique requires a good deal of sensitive skill on the part of the machinist and it requires much time because the machine must be repeatedly stopped. By applying the method which has been described by reference to FIG. 3 the process can be performed by spark erosion much more simply and quickly. An electrode 2 may, for instance, be used of a width corresponding with the length of the journal and its edges may be rounded at 12 to correspond with the radii at the root of the webs 11 on journal 10. A few preparatory spot checks may then be performed to ensure that one pass of the working electrode over the journal revolving at given speed will just produce the desired final dimensions. The machinist need not then repeatedly stop his machine to check the dimensions that have been reached. In principle the workpiece may revolve at any desired speed. However, it will be readily understood that the speed of revolution and the speed of motion of the electrode are inter-related and, as has been mentioned, this inter-relationship can be readily found by making a few preliminary tests, the result being influenced by the properties of the materials of workpiece and electrode as well as upon the electrical power applied.

The described procedure permits crankshaft journals to be machined by spark erosion and, apart from the aforedescribed advantages thereby secured, there is the further advantage that the surface will be free from burnt spots which can easily be formed when using a grinding wheel either as a result of excessive pressure or of excessive relative speed between the work surface and the face of the wheel. Since the production of peripheral scoring will also be avoided the spark eroded surface exhibits an excellent finish with little roughness.

The several advantages that are secured in finishing crankshaft journals will naturally also arise in other cases, irrespectively as to whether these relate to cylindrical or flat types of work, and profiles may be eroded in each case in the direction of electrode traverse.

What I claim is:

1. In the method of processing the surface of a workpiece by spark erosion by means of an electrode and which comprises a traversing motion of the electrode relative to the said surface while erosion proceeds and along a path which correctly maintains the width of the spark gap while continuously advancing unused parts of the electrode to the working zone, the improvement which consists in rotating the electrode about an eccentric axis to impart to a peripheral face portion thereof a progressive in-feed movement towards the workpiece to maintain the correct spark gap while said face portion traverses the workpiece.

2. In the method of processing the surface of a workpiece by spark erosion by means of an electrode and which comprises a traversing motion of the electrode relative to the said surface while erosion proceeds and along a path which correctly maintains the width of the spark gap while continuously advancing unused parts of the electrode to the working zone, the improvement which consists in that the electrode is given a movement bodily which is the resultant of a component in-feed movement of the electrode towards the workpiece and a component movement of traverse of the workpiece, the electrode being of wedge form contoured to the path of the said resultant movement and the said resultant path of motion being generated by an exclusively linear motion of the electrode with the in-feed motion produced by the increasing thickness of the wedge in the direction of traverse and determined in relation to the speed of displacement to maintain the correct spark gap.

References Cited in the file of this patent

UNITED STATES PATENTS

| | | |
|---|---|---|
| 2,850,618 | Rudorff | Sept. 2, 1958 |
| 2,903,557 | Matulaitis | Sept. 8, 1959 |